Patented Nov. 7, 1933 　　　　　　　　　　　　　　　　　　　1,934,650

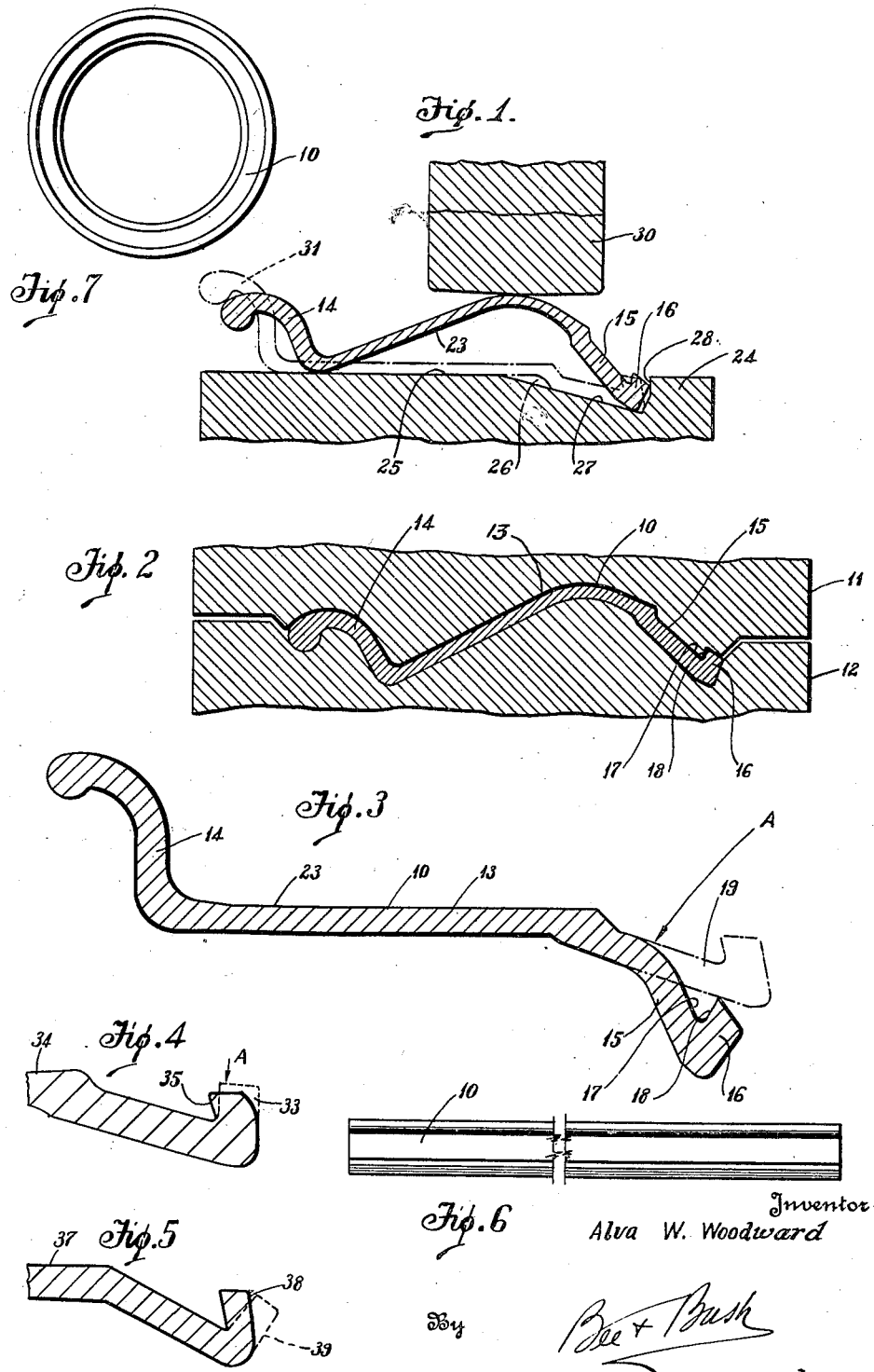

UNITED STATES PATENT OFFICE 1,934,650

MANUFACTURE OF RIM SECTIONS

Alva W. Woodward, Akron, Ohio, assignor to Wingfoot Corporation, Wilmington, Del., a corporation of Delaware Application November 19, 1930
Serial No. 496,669

4 Claims. (Cl. 29—159.1)

This invention relates to the manipulation of metal, and it has particular relation to the manufacture of metallic rims utilized on vehicles for supporting pneumatic tires.

One object of the invention is to provide a method of so manipulating bars of metal that pneumatic tire-supporting rims can be manufactured more accurately and uniformly than has been practically possible prior to this invention.

Another object of the invention is to provide a method of manufacturing pneumatic tire supporting rims by means of which undesirable stresses ordinarily set up in the metal during manipulation thereof, are obviated.

Particularly, the invention concerns the manufacture of a pneumatic tire-supporting rim having a substantially cylindrical base, an axially inclined portion at one edge of the base, and a flange at the outer edge of the inclined portion which projects from the outer periphery of the rim at an acute angle with respect to the base of the rim and in a direction toward the median circumferential line thereof. Owing to the fact that this flange is directed as described, it slightly overlaps the inclined portion of the base and for this reason it is impossible to provide a mill roll which will contact with that side surface of the flange adjacent the base and that portion of the inclined edge of the base overlapped thereby.

According to one method of manufacturing such a rim, the flange is maintained in alignment with the plane of the wheel until the last rolling operation of the rim is to be performed. Then the outer edge portion of the flange is prevented from being deformed by a milling roll constructed for this purpose, and the radially outer edge of the flange is pressed toward the base of the rim by a portion of the roll, thereby causing a movement of the metal toward the inclined portion of the base. As a result, the side surface of the flange adjacent the base is deflected toward the latter and is inclined with respect to the plane of the base. One disadvantage of this method of procedure is that the metal in the flange is subjected to undesirable stresses and is weakened accordingly. Another disadvantage of such method is that the side of the flange adjacent the base and that portion of the rim adjacent the intersection of the flange and the inclined portion of the base are not accurately formed. Owing to the latter fact, rims manufactured by that method are not uniform in construction.

According to another method of manufacturing rims previously practiced, the flange at the edge of the inclined portion of the base finally is bent to a position inclined with respect to the axis of the rim and toward the median circumferential line of the base, after the mill rolling operations are completed. This step in the procedure was performed while the rim was cold and that portion of the metal at the junction of the inclined portion of the base of the flange was subjected to considerable bending stresses. Particularly in view of the fact that the metal was so bent while cold, these stresses so weakened the metal that frequent failure of the rims in practice occurred.

In the construction of rims described, the flange at the edge of the base of the rim is utilized to retain a split or endless member, depending on whether or not the base of the rim is endless, or split, respectively, which was provided with a tire-engaging flange. Inasmuch as high pressures in pneumatic tires are exerted laterally against a tire-engaging flange, the necessity of avoiding undesirable and weakening stresses in the flange on the base, and of uniformly and accurately forming such flange, should be manifest.

According to this invention the cylindrical base of the rim is rolled while heated, to such form that at least a portion of it is laterally bent. Hence, the flange may be rolled into a position where its side adjacent the base will not overlap the inclined portion of the latter, considering the plane of the flat base portion as a base for determining overlapping, while at the same time the inclined portion of the base and the flange may be rolled into their final, relative positions. Subsequently, the rim is straightened by depressing the bent portion of the base and forming it into its normal shape. The latter step in the procedure causes the inclined portion of the base and the flange to be effectively bent about an intermediate circumferentially extending portion of the base until finally the inclined portion of the base is in its proper position and the flange then is inclined and overlaps the latter slightly. It is evident that the metal in the flange along the inclined portion of the base is not subjected to bending stresses or other stresses such as were set up in the metal by the methods of manufacturing previously referred to, and that the adjacent walls of the inclined portion and the flange may be accurately and uniformly formed. While a slight bending stress in intermediate portions of the base occurs, when it is straightened while cold, such stresses do not undesirably weaken the rim. Moreover, such stresses as may occur, are set up in a part of the rim in which bending stresses do not occur during operation of the rim.

For a better understanding of the invention, reference may now be had to the accompanying drawing, forming a part of this specification in which:

Fig. 1 is a cross-sectional view of an apparatus employed for straightening a rim previously bent transversely during manipulation of the rim while heated;

Fig. 2 illustrates a cross-sectional view of a rim similar to that shown by Fig. 1 and diagrammatically shows how steel mill rolls are utilized in one stage of manufacture of the rim while heated;

Fig. 3 is a cross-sectional view of a rim section illustrating a slightly different manner of shaping the section between the last steel mill rolls;

Fig. 4 is a fragmentary cross-sectional view of a rim of a particular type illustrating how a flange on the rim is deflected from a substantially radial position to an inclined position with respect to the axis of the rim, according to a prior method of manufacture;

Fig. 5 is a view similar to that shown by Fig. 4 illustrating how such a flange was bent from a position in which it was formed by rolling while heated, to a position inclined with respect to the axis of the rim, according to another method previously practiced;

Fig. 6 is a side view of a rim section prior to bending it into circular form; and Fig. 7 is a side view of the section after it is bent into circular form.

It is well known in the rim industry that a rim is formed by taking a billet of metal from a furnace and varying it in contour until the rim is substantially in the form of an elongate section. Subsequently this section is bent into the form of a circle and its ends are welded together. Inasmuch as the mill rolling operation in general is not new, it is not believed necessary to describe it in detail. Reference will be had only to the last mill rolling operation, so far as the description of the invention in detail is concerned.

Referring to Fig. 2, a section of rim 10 illustrates the form of the rim, after it passes between the last steel mill rolls. A pair of fragmentary mill rolls are illustrated at 11 and 12. The rim 10 is provided with a substantially flat base 13, a tire-engaging flange 14 at one edge of the base, an inclined portion 15 at the opposite edge of the base, and a flange 16 projecting from the outer edge of the inclined portion 15. It is apparent that adjacent walls 17 and 18 of the inclined portion 15 of the base and the flange 16, respectively, are so positioned with respect to the roller 11 that a portion of the roller easily may fully contact with such surfaces and accurately form them at the angle desired. Also the surface 18 does not overlap the surface 17 considering the horizontal axis of the roller 12 as a base for determining overlapping. The section 10 is shaped to its final form with the exception that it must be deflected to a position indicated at 19 by broken lines in Figs. 1 and 3.

Figure 1 shows the rim section 10 disposed on a stationary platen 24 having a flat base portion 25 and a gutter 26 defined by an inclined surface 27 and a wall 28 substantially normally disposed with respect to the surface 25. It should be understood that the rim section 10 is in the form of an elongate section which has not been bent into circular form. Hence, the edge of the rim section adjacent the tire-engaging flange 14 may be seated on the surface 25 while the opposite edge adjacent the flange 16 may be disposed in the gutter 26 adjacent the junction of the surfaces 27 and 28. In order to move the laterally bent portion of the rim section 23 downwardly, a movable platen 30 is provided. When this platen is moved downwardly against the base portion of the rim section 10, the edge of the section adjacent the tire-engaging flange 14 moves laterally until it assumes a position indicated by broken lines 31. It will be observed that the vertical wall 28 of the stationary platen 24 prevents lateral movement in one direction of the edge of the rim section opposite the tire-engaging flange 14.

Figure 3 illustrates a rim section 23 similar to section 10, but which has been shaped in a slightly different manner by the steel mill rolls. It will be observed that the base portion of the section is flat and the tire engaging flange 14 is in its normal position with respect thereto. The inclined portion 15 and the flange 16 are deflected downwardly however, thereby permitting a full contact of the mill roll with the surfaces 17 and 18. The section 23 may be finally shaped by the same apparatus as that shown by Figure 1, with the exception that the movable platen preferably should have a path of movement substantially as indicated by the arrow A in Figure 3.

Figure 4 shows a fragmentary section of a rim of the type illustrated in Figures 1 and 2 illustrating a method of manufacture previously practiced. In this figure, the rim is provided with a flange 33 which is disposed substantially vertically with respect to the base 34 of the rim prior to the last mill rolling operation performed on the rim. Owing to the fact, as previously stated, that the rolls of the milling machine could not contact with adjacent surfaces of an inclined flange and the inclined portion of the base when the former overlaps the latter, it was necessary in the last mill-rolling operation to incline the flange 33 by pressure directed downwardly against the outer edge of the flange as indicated by the arrow A. The outer side wall of the flange was prevented from expanding or deforming laterally, which caused the inner wall thereof to be deflected toward the base 34 of the rim as indicated at 35. Inasmuch as the inclined wall 35 is formed by such pressure, frequently it was not accurate and the junction of the inclined surface 35 and the inclined portion of the base was irregular. Moreover, considerable stresses were set up in the flange 33 by such pressure, even though the rim was heated during this step in its manufacture.

Figure 5 illustrates a rim 37 of a slightly different type from that shown by Figure 3. In this construction a flange 38 is provided which is considerably wider than the flange 33 in that construction shown by Figure 3. It has been the practice to roll a rim of this character with the flange 38 finally positioned as indicated at 39 by broken lines. Subsequently, the flange was bent toward the base of the rim while cold until it assumed its normal position. This prior method subjected the metal at the points where bending occurred, to very undesirable stresses.

Figure 6 shows a rim section in its finished form prior to bending it into circular shape.

Figure 7 shows the same section in circular form. Various well known apparatus may be used for bending the section into circular form. Finally the ends of the section are welded together.

The practice of the invention obviates stresses in the inclined flanges at the edges of rims of the type described and, consequently, provides for accurate and uniform manufacture of more durable rims. The apparatus described and illustrated for performing one step in the method insures proper formation of the rim in the final step of manufacture prior to bending the section into circular form and welding. Such apparatus is inexpensive and may be manufactured and operated very easily.

Although only the preferred form of the invention has been described and shown in detail, it will be apparent to those skilled in the art that the invention is not so limited but that various minor modifications may be made therein, without departing from the spirit of the invention or from the scope of the appended claims.

What I claim is:

1. A method of manufacturing a rim section having a base with a gutter at an angle to the rim base, which comprises forming said rim with a laterally bent portion, maintaining one edge of the section stationary and then straightening the bent portion by a flattening operation while allowing the other edge of the section to move laterally over a plane surface, whereby the proper position of the section on the flattening means will be insured, as will be the relation and the angle between the gutter and the rim base.

2. A method of making a rim which includes forming a rim blank with base portions joined at an angle to each other, forming a tire-retaining flange at substantially right angles with one portion of the base, providing the other portion of the base with a gutter at its edge at an angle to the base portion, and flattening the base portions to a common plane while positioning the rim by maintaining one edge of the rim laterally stationary while allowing the other edge of the rim to move.

3. In the manufacture of a pneumatic tire rim having intersecting cylindrical and conical surfaces on its inner periphery, the steps which comprise forming a ring strip blank with flanged edge portions properly related to the adjacent portions of the strip body but with the intermediate body portion transversely bent, holding one edge of the strip against lateral displacement, and flattening said intermediate body portion while its edge is so held whereby to definitely locate portions of the body in two intersecting planes and with the line of intersection definitely related to the held edge of the strip.

4. The method of making a rim section having a flat base with a side gutter extending at an angle thereto comprising the steps of forming the section initially with the base bent into portions joining at an angle to each other, and flattening said base portions while holding one side only of the section against lateral movement to insure the proper angular relation of the side gutter and the base.

ALVA W. WOODWARD.